United States Patent [19]
Addison

[11] 3,749,126
[45] July 31, 1973

[54] METHOD AND APPARATUS FOR AUTOMATICALLY CONTROLLING FLUID FLOW

[75] Inventor: Frank E. Addison, Lafayette, La.

[73] Assignee: James Boring Montgomery, Anatole J. Plaisance, Howard L. Franques, Jr., and Joseph Arabie, Jr., all of Lafayette, La., part interest to each

[22] Filed: May 3, 1972

[21] Appl. No.: 249,913

[52] U.S. Cl. ................................. 137/613, 138/42
[51] Int. Cl. ...................... F16k 35/00, E21b 33/06
[58] Field of Search ...................... 137/613, 614.13, 137/180; 138/31, 40, 42

[56] References Cited
UNITED STATES PATENTS

| | | | |
|---|---|---|---|
| 2,264,517 | 12/1941 | Foster | 138/31 X |
| 1,273,949 | 7/1918 | Summerrow | 138/40 X |
| 1,779,448 | 10/1930 | Pomeroy | 138/31 |
| 1,436,417 | 11/1922 | Trumble | 138/42 |
| 2,118,248 | 5/1938 | Chrisman | 138/40 X |
| 2,284,170 | 5/1942 | Santiago | 138/40 X |

*Primary Examiner*—Samuel Scott
*Assistant Examiner*—Ira S. Lazarus
*Attorney*—Bradford E. Kile

[57] ABSTRACT

An automatic flow control apparatus including a generally elongate housing which may be inserted within a fluid flow line. The housing has a first end suitable for connection with one portion of a flow line and a second end suitable for connection with a spaced portion of the flow line. Interiorly, the housing is provided with a central longitudinal passage which includes an enlarged longitudinally extending chamber intermediate the first and second ends of the housing. A first valve is mounted within the enlarged chamber for rotation and longitudinal translation from an open position at a first end of the enlarged chamber to a closed flow blocking position at a second end thereof. A second valve is positioned within the housing generally at the first end thereof and adjacent to the central longitudinal passage for automatically inducing, in response to impingement of a surge of fluid flow, rotation and longitudinal translation of the first valve from an open position into a closed position within the enlarged chamber.

19 Claims, 5 Drawing Figures

United States Patent [19]
Addison
[11] 3,749,126
[45] July 31, 1973
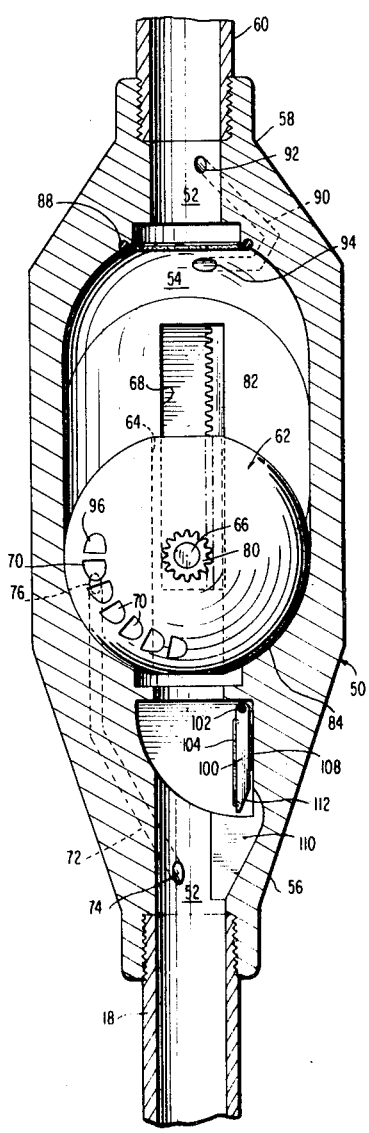

Patented July 31, 1973

METHOD AND APPARATUS FOR AUTOMATICALLY CONTROLLING FLUID FLOW

BACKGROUND OF THE INVENTION

This invention pertains to a method and apparatus for controlling the flow of fluid through a conduit or flow line. More particularly this invention relates to controlling fluid flow by automatically closing off the flow line in the event a strong surge of flow is encountered.

While the subject invention is amenable to a wide variety of applications it has been found to be particularly useful as a method and apparatus for preventing oil and/or gas well blowouts. In this connection in oil and/or gas drilling and production one of the most feared and expensive accidents which may take place is a blowout. Blowouts occur when an unanticipated pressure pocket is encountered which is greater than the pressure imposed within the bore hole by drilling fluid. If such a situation is encountered, the drilling fluid is likely to be driven wildly up the line with an ultimate result of significant structural damage and/or a violent fire.

In the past numerous devices have been designed to minimize the possibility of oil well blowouts. At least one such previously known blowout preventer is disclosed in a U. S. Lewis et al. Pat., No. 3,589,667, wherein a rotary plug valve may be actuated to block fluid flow in the event of a blowout.

While previously known blowout prevention devices have achieved a degree of commercial application, room for significant improvement remains. More specifically stated, previously known devices while possessing a degree of theoretical appeal are often unreliable when actually used in the field. Further, many systems are complicated in design, requiring considerable initial capital expense, plus a substantial service schedule in order to properly maintain the units in operating condition. Still further, normal field hands often find previously known units difficult to service. Moreover, many of the current known devices are not fully automatic for both actuation and resetting. Additionally, current devices often damage a drilling or production pipe upon actuation, therefore dictating considerable down time to replace ruptured members.

OBJECTS OF THE INVENTION

It is therefore a general object of the invention to obviate or minimize problems of the type previously described.

It is a specific object of the invention to provide a novel method and apparatus for reliably controlling the flow of fluid through a flow line.

It is a further object of the invention to provide a novel method and apparatus for controlling fluid flow which is automatic both in terms of actuation and also resetting capability.

It is yet a further object of the invention to provide a novel method and apparatus for controlling fluid flow which is readily serviceable and, if required, replaceable.

It is still a further object of the invention to provide a novel method and apparatus for controlling the flow of fluid in a flow line which is initially relatively inexpensive and is composed of a synergistic formulation of proven components.

It is another object of the invention to provide a novel method and apparatus for controlling the flow of fluid in a drilling and/or production string which will permit the unobstructed utilization of lines designed to run down the string.

It is still another object of the invention to proivde a novel method and apparatus for controlling the flow of fluid in a drilling and/or production string which will be effective to minimize the possiblity of a hazardous blowout without damaging the string.

THE DRAWINGS

Further objects and advantages of the invention will become apparent from the following detailed description taken in conjunction with the accompanying drawings, wherein.

Figure 2:
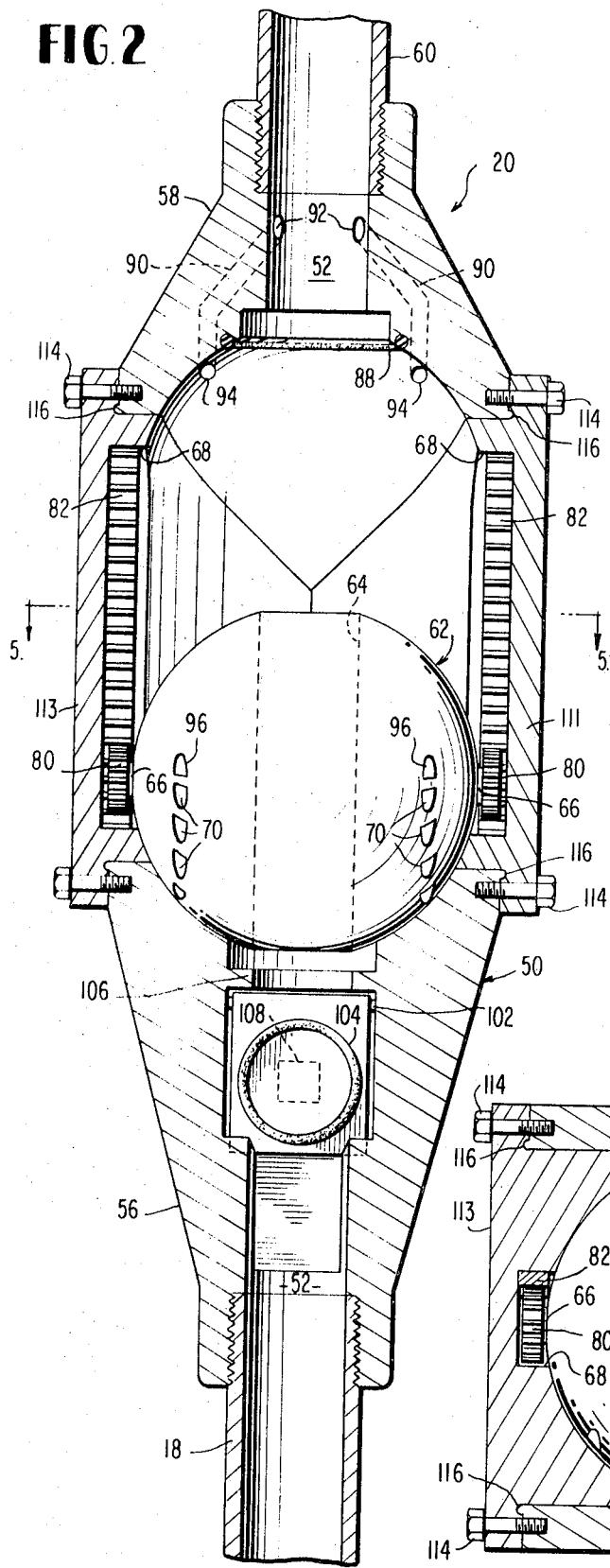
FIG. 2 is a front elevational view in cross section of the subject flow control apparatus disclosing a generally longitudinally extending housing, a first plug valve within a longitudinally extending enlarged chamber and a second valve positioned at a first end of the housing for automatically actuating the first plug valve.
Figure 5:
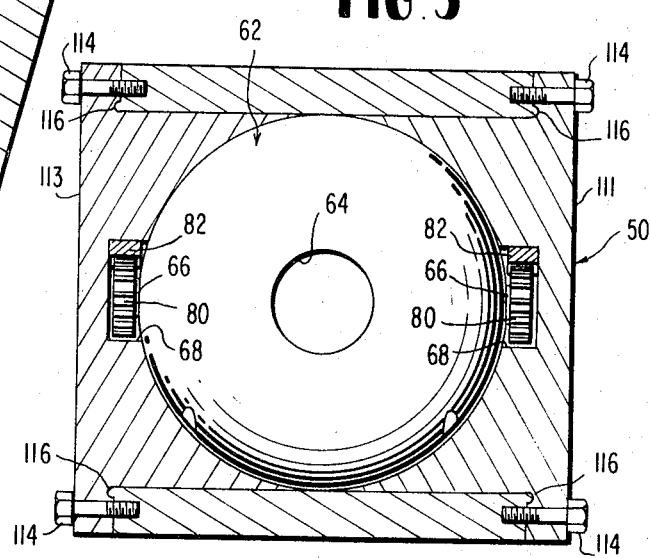
Figure 3:
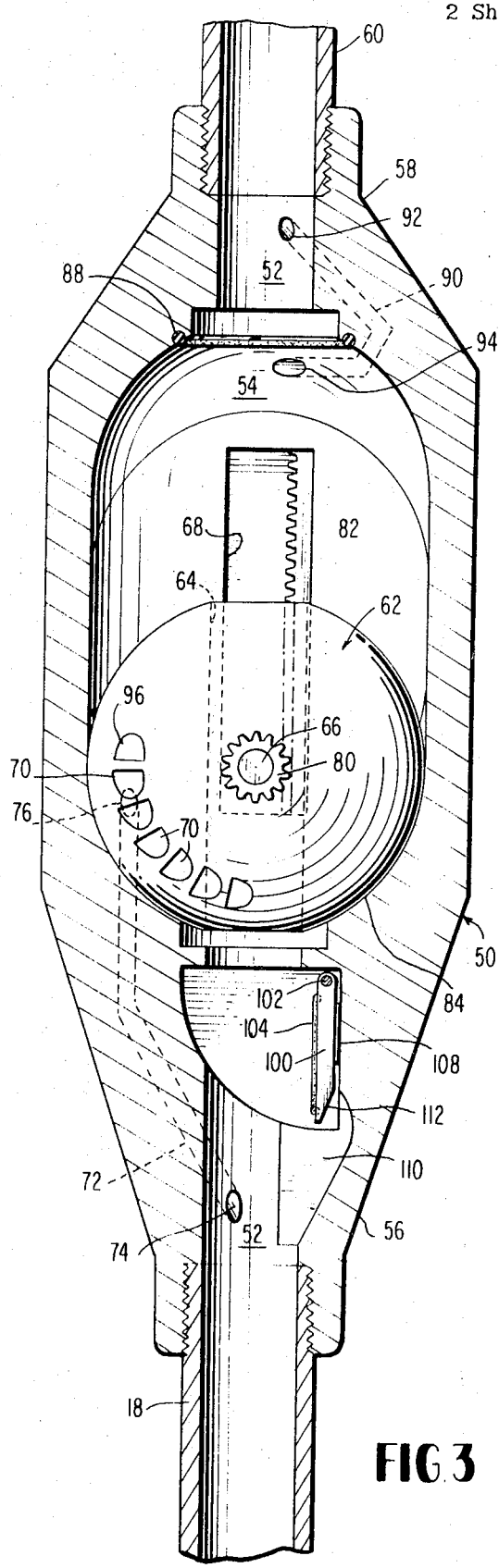
FIG. 3 is a side elevational view of the flow control apparatus disclosed in FIG. 2 including the first plug valve and the second pilot closure in an open posture to permit fluid to freely flow through the flow control apparatus.
Figure 4:
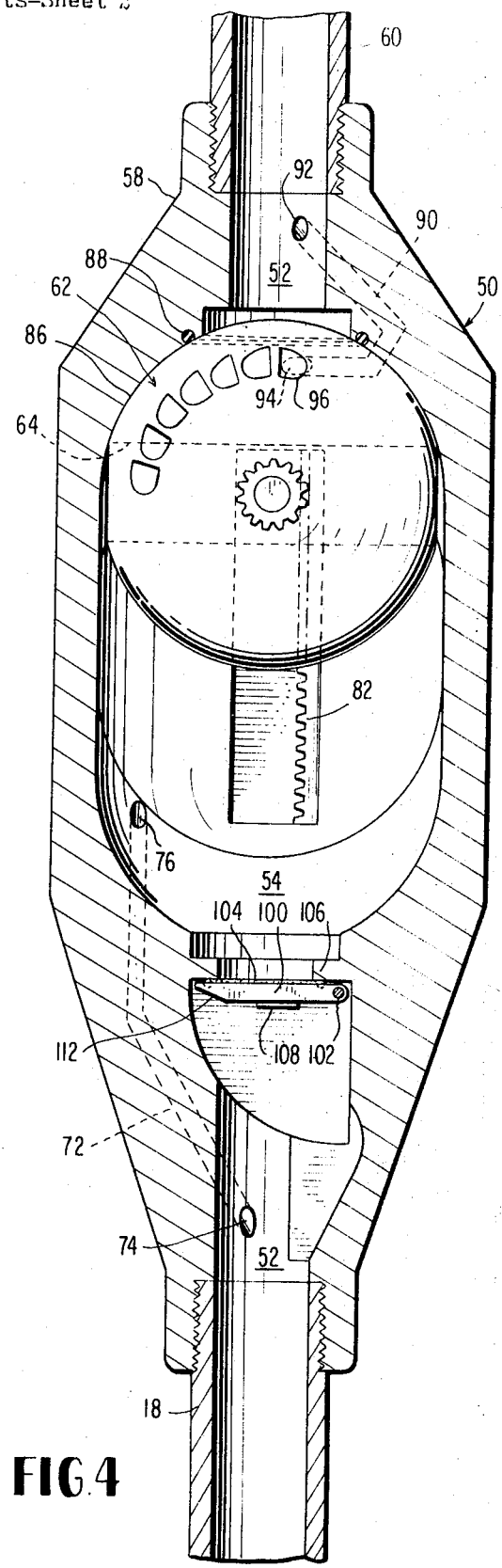

FIG. 4 is a side elevational view of the flow control apparatus similar in general character to that of FIG. 3 wherein the first plug valve and the second pivotally mounted pilot closure are in a closed posture to seal off fluid flow through the flow control apparatus; and FIG. 5 is a cross-sectional view taken along section line 5—5 in FIG. 2 and discloses an assembly relationship of housing components of the flow control apparatus.

DETAILED DESCRIPTION

Typical Operational Environment

Figure 1:
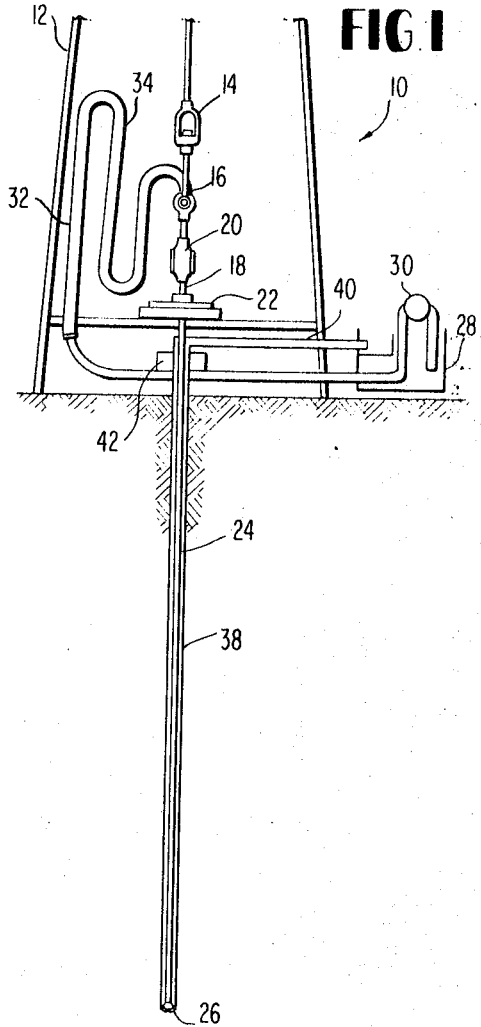
FIG. 1 is a schematic illustration of at least one working environment where the subject automatic flow control invention has been found to be particularly useful.

As previously mentioned, the subject flow control method and apparatus is amenable to a wide variety of applications. However, it has been found that the instant method and apparatus is particularly useful for preventing oil and gas well blowouts. Therefore, for purposes of illustrating this particular utility of the subject invention, reference may be had to FIG. 1 wherein a conventional rotary drilling rig 10 is shown.

The rotary drilling rig 10 includes a derrick 12 which provides the vertical clearance necessary to raise and lower a drilling string into and out of a bore hole during drilling operations. In this connection, a block crown (not shown) is supported at the apex thereof. The block crown is connected to a traveling block and rotary hook assembly 14 which in turn supports a swivel 16. The swivel 16 is connected to a kelly 18 through an automatic flow control apparatus 20 comppprising the subject invention. The kelly 18 is translatably mounted through a rotary table 22 which is connected for rotation to engines not shown. A drilling string 24 is attached downstream of the kelly and terminates with a rotary drilling bit 26 for penetrating earth formations.

In order to remove cuttings from the bore hole, a viscous fluid or mud which is prepared in a mud pit 28, is picked up through a sludge pump 30 and delivered via a stand pipe 32 and a rotary hose 34 through the swivel 16 and automatic flow control apparatus 20 to the kelly 18 and drill string 24. The mud passing down the drill string 24 exits through water courses or nozzles in the drilling bit 26 to pick up cuttings. The mud and cuttings then rise concentrically about the drilling string 24 within a casing 38 up to the surface where a flow line 40 conveys the mud and cuttings back to the mud pit.

Under nominal working conditions, fluid is continuously circulated from the mud pit through the automatic flow control apparatus 20, down the drilling string 24, and back through casing 38 to the mud pit. It is not always possible, however, to predict the exact magnitude of pressures which will be encountered in drilling a well. consequently, it is not uncommon to encounter pressures greater than those imposed by the circulating drilling fluid with a result that formation fluid sometimes flows into the bore hole and eventually to the surface. This effect is called a blowout and, as previously noted, is one of the most feared and expensive accidents which can occur in well drilling.

One type of blowout preventer is a device mounted within the derrick substructure as at 42 and serves to block the annular passage between the drilling string 24 and the casing 38. In order, however, to automatically block the passage of the drilling string itself, the automatic flow control apparatus 20 is positioned between the swivel 16 and kelly 18 as previously described.

Detailed Structure

Turning now particularly to FIGS. 2-4, there will be seen detailed front and side elevational views of the subject automatic flow control apparatus.

The flow control apparatus 20 includes a housing body 50 which is generally elongate in character and is fashioned with a central longitudinally extending passage 52 including an enlarged central longitudinally extending chamber 54. The housing body 60, as previously noted, is operatively connected at a first end thereof 56 to the kelly 18 and at a second end thereof 58 to a conduit segment 60 which joins with the swivel and rotary hook 14.

Mounted within the enlarged chamber 54 is a first or plug valve means 62 which is formed with a flow through passage 64 therein. The exterior configuration of the plug valve 62 is depicted as being generally spherical, however, other geometrical exterior configurations such as cylindrical, etc., are also contemplated by the subject invention. The plug valve 62 is suitable to rotate and translate from an open posture resting upon a curved surface 84 at the first end of the elongate chamber 54, note FIG. 3, to a closed posture wherein the surface of the valve 62 will simultaneously abut against a curved surface 86 at the second end of the enlarged chamber 54 and sealingly engage an O-ring 88 mounted within the second end of the enlarged chamber, note FIG. 4.

In order to guide the plug 62 for translation within the enlarged elongate chamber 54, trunnions 66 are formed on generally opposite sides of the valve and extend generally normal to the longitudinal axis of the flow through passage 64. The trunnions 66 are mounted within rectangularly shaped recesses 68 fashioned into opposing lateral portions of the housing 50.

In order to translate the first valve 62 upward and rotate the flow passage 64 from an open vertical posture as depicted in FIG. 3 to a closed transverse posture as depicted in FIG. 4, the lateral surfaces of the ball have therein a plurality of impulse buckets 70 which extend in alignment around the periphery of the plug valve 62. To provide fluid for engaging said buckets secondary fluid passages 72 are fashioned through the first end 56 of the housing 50 and have a first end 74 in fluid communication with the central fluid channel 52 at the first end of the housing and a second end 76 which open into the central enlarged chamber 54 at a position adjacent a first one of the aligned impuse buckets 70. Therefore, in the event fluid passes through secondary passage 72, it will impinge upon the impulse bucket 70 to lift and rotate the plug valve 62 from an open position at the first end of the enlarged chamber 52 as shown in FIG. 3 to a closed position at the second end of the enlarged chamber 54 as depicted in FIG. 4.

The plug valve 62 is constrained to a limited degree of rotation from an open position to a closed posture by the provision of stop means interconnecting the plug valve 62 and the enlarged housing 54. For ease of illustration, the stop means has been depicted in the drawings as comprising the travel limits of pinion gears 80 mounted about the periphery of the trunnions which mate with racks 82 mounted along one surface of the guide channels 68, note FIG. 5. While a rack and pinion stop system has been disclosed for each of illustration, other forms of stop means are fully contemplated by the subject invention such as for example pads projecting from channels 68 which may engage recesses in the ends of trunnions 66 or cam recesses fashioned within the surface of the plug valve 62 which engage projections extending from the enlarged chamber walls, etc.

Once the plug valve 62 is in a closed posture, as depicted in FIG. 4, and it is desirable to open the valve, the valve may be automatically opened by merely pressurizing central channel 52 at the second end of the housing. Such pressure will tend to translate the ball downwardly guided within the channels 68 by the trunnion 66. In order, however, to simultaneously rotate the flow through passage 64 back into axial alignment with the central longitudinal passage 52, means are provided which interconnect the plug 62 and an interior portion of the enlarged chamber 54 to positively provide the desired counter-rotational motion. For ease of illustration, the counter-rotational means is depicted in the drawings as comprising the rack and pinion 82 and 80, respectively, as previously discussed. It will be realized, however, that other means may be provided to perform this counter-rotational function such as projecting cams within the interior surface of the channel 54 which would engage with recesses in the plug 62 to positively provide for counter-rotational movement, or camming surfaces between the trunnions and channels to at least ensure that the ball will counter-rotate as it translates downwardly, etc.

In the event that the plug valve 62 becomes frozen to the seal 88 auxiliary passages 90 are fashioned within the second end of the housing 50 and having ends 92 thereof opening into the channel 52 above the seal 88 and second ends 94 thereof opening into the enlarged chamber 54 adjacent to the surface of the plug valve 62 in a closed posture. The surface of the plug valve in turn is fashioned with impulse bucket 96 on each side of the plug which is directed for actuation in a reverse posture to the impulse buckets 70 such that fluid may pass around the seal 88 and generally tangentially impinge upon the surface of the plug valve 62 to give an initial rotational kick to the ball to start the downward rotational and translational motion thereof.

In order to automatically induce rotation and translation of the plug valve 62 from an open to a closed posture, a second or pilot valve means 100 is positioned adjacent to the central longitudinal passage 52 of the housing at the first end 56 thereof. The pilot valve 100 is connected for pivotal motion to a pivot pin 102 which transversely extends with respect to the central axis of longitudinal passage 52. The pilot valve 100 is provided with a generally circular seal 104 suitable to engage with a corresponding circular lip 106 which projects into the central passage 52 at the first end of the housing.

The pilot valve 100 may be biased by the provision of a permanent magnet 108 which will co-act with the housing 50 to maintain the pilot valve in a normally open posture as depicted in FIG. 3. While a permanent magnet 108 is particularly illustrated it will be appreciated by those skilled in the art that other biasing means may be provided such as a tension spring or the like.

In order to actuate the pilot valve 100 into a closed posture against the bias provided by magnet 108, a channel or passage 110 is fashioned within the first end of the housing so that fluid flowing from the first end of the housing to the second end thereof may accumulate behind a lip 112 of the pilot valve and thus pivot the valve into the flow stream and a closed posture as depicted in FIG. 4. Once the pilot valve is closed, fluid within the first end of the housing will be diverted through auxiliary channels 72 to translate and rotate the main valve in an operational manner to be discussed more fully hereinafter.

In order to assemble and disassemble for inspection and/or replacement of worn parts, the housing body 50 is provided with opposing side panels 111 and 113, note FIGS. 2 and 5. The panels are interiorly fashioned with curved surfaces to intimately engage with the outer surface of the first valve 62. The panels are connected to the housing 50 by the provision of conventional threaded fasteners 114 brought into proper alignment by engagement with aligning nipples 116 which project from the housing 50.

Operation

Operationally, the subject automatic flow control apparatus is normally maintained in an open flow through posture such as depicted in FIGS. 2 and 3. In this connection, the pilot valve 100 is biased against the surface of the first end 56 of the flow control housing and the main valve 62 rests upon the curved surface 84 of the first end of the enlarged central chamber 54 with the flow through passage 64 thereof in axial alignment with the central longitudinal passage 52 which extends through the housing 50. Therefore, fluid may freely flow from the second end to the first end of the housing as would be the case when the device is utilized as a drill pipe blowout preventer, note FIG. 1. Alternatively, fluid may flow under nominal conditions from the first end to the second end of the hosuing as long as the biasing means 108 is properly dimensioned to maintain the pilot valve in an open posture.

In the event that a strong surge of fluid flow is encounted in a direction from the first to the second end of the flow control housing and in a magnitude sufficient to overcome the preselected bias of the pilot valve 100, the valve will close thus directing fluid through auxiliary passages 72 and onto the impulse buckets 70 of the plug valve 62. The valve 62 then will rotate and translate upwardly from impingement of fluid thereupon to a closed posture, as illustrated in FIG. 4, wherein the flow through passage 64 is rotated out of alignment with the central passage 52 and the lateral surfaces of the plug 62 blocks fluid flow through the housing 50. While the flow passage 64 is depicted as being rotated 90° it will be appreciated that a lesser degree of rotation will be satisfactory for operation of the subject invention. The only requirement is that the flow through passage 64 must be rotated completely out of alignment and fluid communication with the central longitudinal passage 52 at the second end of the enlarged chamber 54.

During the translational movement the trunnions and channels, as previously mentioned, serve to guide the plug valve 62 and the valve is stopped from free rotational movement by the provision of a stopping means such as, for example, a rack and pinion. After the source of surging flow from the first to the second end of the housing is dissipated, the flow through apparatus may be automatically reset in an open mode merely by pressurizing the second end of the housing 58. In this connection, as fluid accumulates at the second end of the housing, the plug valve 62 will be forced downwardly away from seal 88. In the event the valve 62 is frozen to the seal, diversion of the fluid at the second end of the housing through passages 90 and tangentially to the valve surface is normally sufficient to break the plug away from the seal and begin rotation and translation downwardly. The trunnion and channel again guide translational movement of the plug valve 62 and to ensure proper counter-rotation, means for rotating the valve such as, for example, the rack pinion are provided.

As the main valve 62 descends, fluid within the first end of the chamber 54 will be forced against the pilot valve to open or reset the pilot valve in a posture as depicted in FIG. 3. The apparatus is thus automatically reset for subsequent automatic actuation in the event a further strong surge of fluid flow is encountered through the flow control apparatus from the first to the second end thereof.

MAJOR ADVANTAGES OF THE INVENTION

From the foregoing it will be appreciated that the subject flow control method and apparatus provides a rugged and unsophisticated yet highly reliable and effective means for controlling the flow of strong surges of fluid through a conduit.

Further, the instant system is automatically operable both in terms of actuation to block a strong surge of fluid flow and resetting to provide capability for blocking subsequent surging flow.

Moreover, the invention is a synergistic association of components of proven operability to provide an inexpensive device which is readily serviceable.

Still further actuation of the subject invention does not result in serious damage to the drill string and therefore considerable down time is avoided which was previously required to replace ruptured components.

Yet another significant advantage is the ability to run lines down the drill string without becoming fouled in the blowout preventer.

While the invention has been described with reference to preferred embodiments, it will be appreciated by those skilled in the art that additions, deletions, modifications, substitutions and other changes not specifically described and illustrated in these embodiments may be made which will fall within the purview of the appended claims.

What is claimed is:

1. An automatic flow control apparatus comprising:
a generally elongate housing operable to be inserted within a fluid flow line and including a first end connectable to one portion of the flow line and a second end connectable to a spaced portion of the flow line, said housing having a central longitudinal passage extending therethrough including an enlarged longitudinally extending chamber intermediate said first and second ends of said housing;
first valve means positioned within said enlarged chamber for controlling fluid flow through said central longitudinal passage, said first valve means being mounted for rotation and translation within said enlarged chamber from an open position within said enlarged chamber at a first end thereof to a closed position within said enlarged chamber at a second end thereof; and
second valve means positioned within said housing generally at the first end thereof and adjacent to said central longitudinal passage for inducing rotation and translation of said first valve means within said enlarged chamber from an open position at the first end of the enlarged chamber to a closed position at the second end of said enlarged chamber upon said second valve means encountering a surge of fluid flowing through said housing central longitudinal passage from a first end to a second end thereof.

2. An automatic flow control apparatus as defined in claim 1 wherein said means for translation comprises:
trunnion means projecting from generally opposite sides of said plug means; and
channel means recessed within and longitudinally extending along generally opposite sides of the interior surface of said enlarged chamber portion of said housing.

3. An automatic flow control apparatus as defined in claim 2 and further comprising:
means interconnecting an exterior portion of said plug means and an interior portion of said enlarged chamber for guiding said plug means for translation within said enlarged chamber.

4. An automatic flow control apparatus as defined in claim 3 and further comprising:
means interconnecting an exterior portion of said plug means and an interior portion of said enlarged chamber for rotating said plug means at least as said plug means moves from a closed position within said enlarged chamber at the second end thereof to an open position within said enlarged chamber at the first end thereof.

5. An automatic flow control apparatus as defined in claim 1 wherein said first valve comprises:
plug means having a flow through passage therein for axial alignment with said central longitudinal passage of said housing in said open position to permit fluid to flow through said central longitudinal passage and for extension across said central longitudinal passage of said housing in said closed position whereby said plug means will block the flow of fluid through said central longitudinal passage.

6. An automatic flow control apparatus as defined in claim 2 and further comprising:
stop means positioned within the interior of said enlarged chamber for preventing free rotational movement of said plug means at the first and second ends of said enlarged chamber.

7. An automatic flow control apparatus as defined in claim 2 and further comprising:
a valve seat positioned within the interior of said housing at the junction of said enlarged chamber with a portion of said central longitudinal passage at the second end of said housing for receiving in sealing contact said plug means in said closed or flow blocking position.

8. An automatic control flow apparatus as defined in claim 7 and further comprising:
at least one alternate fluid passage fashioned within said housing at the interior thereof wherein one end of said at least one alternate fluid passage is in fluid communication with said central longitudinal passage on one side of said valve seat and the other end of said at least one alternate fluid passage is in fluid communication with said enlarged chamber; and
at least one fluid bucket fashioned within the surface of said plug means and positioned such that when said plug means is in sealing contact with said valve seat said at least one bucket is in fluid registry with the other end of said at least one alternate fluid passage whereby fluid passing through said at least one alternate fluid passage around said valve seat will impinge upon said at least one fluid bucket to disengage said plug means from said sealing contact with said valve seat.

9. An automatic flow control apparatus as defined in claim 1 wherein said second valve means comprises:
a normally open closure means pivotally mounted to said housing on one side of and in fluid communication with said central longitudinal passage whereby a surge of fluid through said central longitudinal passage from the first end of said housing to the second end thereof will automatically swing said closure means across said central longitudinal passage and block the flow of fluid therethrough.

10. An automatic flow control apparatus as defined in claim 9 and further comprising:
means for biasing said closure means in a normally open posture to permit fluid to freely flow through said central longitudinal passage.

11. An automatic flow control apparatus as defined in claim 10 wherein said biasing means comprises:
a permanent magnet connected to said closure means to bias said closure means into an open position adjacent said central longitudinal passage.

12. An automatic flow control apparatus as defined in claim 9 and further comprising:
at least one alternate fluid passage fashioned within said housing at the first end thereof wherein one end of said at least one alternate fluid passage is in fluid communication with said central longitudinal passage on one side of said closure means at least one said closure means is in a fluid blocking position across said central longitudinal passage and the other end of said at least one alternate fluid passage is in fluid communication with said elongate chamber; and at least one fluid bucket fashioned within the surface of said first valve means and positioned such that when said first valve means is in an open position within said enlarged chamber at a first end thereof said at least one fluid bucket is in fluid registry with the other end of said at least one alternate fluid passage whereby fluid passing through said at least one alternate fluid passage around said closure means will impinge upon said at least one fluid bucket to rotate and translate said first valve means from an open position within said enlarged chamber at a first end thereof to a closed position within said enlarged chamber at a second end thereof.

13. An automatic flow control apparatus as defined in claim 12 wherein said at least one fluid bucket comprises:
a row of aligned fluid impulse buckets positioned within said first valve means to successively advance in primary fluid communication with the other end of said alternate fluid passage as the first valve means rotates and translates into a closed position.

14. An automatic flow control apparatus comprising:
a generally elongate housing operable to be inserted within a fluid flow line and including a first end connectable to one portion of the flow line and a second end connectable to a spaced portion of the flow line, said housing having a central longitudinal passage extending therethrough including an enlarged longitudinally extending chamber intermediate said first and second ends of said housing;
plug valve means having a flow through passage therein positioned within said enlarged chamber for controlling fluid flow through said central longitudinal passage, said plug valve means being mounted for rotation and translation within said enlarged chamber from an open position within said enlarged chamber at a first end thereof wherein the flow through passage is in axial alignment with said central longitudinal passage of said housing to a closed position within said enlarged chamber at a second end thereof wherein said flow through passage extends across said central longitudinal passage of said housing to block the flow of fluid through said central longitudinal passage;
trunnion means projecting from generally opposite sides of said plug valve means and channel means recessed within and longitudinally extending along generally opposite sides of the interior surface of said enlarged chamber portion of said housing for guiding said plug valve means for translation within said enlarged chamber;
stop means positioned within the interior of said enlarged chamber for preventing free rotational movement of said plug valve means at the first and second ends of said enlarged chamber;
a valve seat positioned within the interior of said housing at the junction of said enlarged chamber with a portion of said central longitudinal passage at the second end of said housing for receiving in sealing contact said plug valve means in said closed position;
at least one alternate fluid passage fashioned within said housing at the second end thereof wherein one end of said at least one alternate fluid passage is in fluid communication with said central longitudinal passage on one side of said valve seat and the other end of said at least one alternate fluid passage is in fluid communication with said enlarged chamber;
at least one fluid bucket fashioned within the surface of said plug valve means and positioned such that when said plug valve means is in sealing contact with said valve seat said at least one bucket is in fluid registry with the other end of said at least one alternate fluid passage whereby fluid passing through said at least one alternate fluid passage around said valve seat will impinge upon said at least one fluid bucket to disengage said plug valve means from sealing contact with said valve seat;
a normally open closure means pivotally mounted to said housing on one side of and in fluid communication with said central longitudinal passage for blocking the flow of fluid through said central longitudinal passage upon a surge of fluid flowing from the first end of said elongate housing to the second end thereof;
at least one alternate fluid passage fashioned within said housing at the first end thereof wherein one end of said at least one alternate fluid passage is in fluid communication with said central longitudinal passage on one side of said closure means, at least when said closure means is in a fluid blocking position across said central longitudinal passage, and the other end of said at least one alternate fluid passage is in fluid communication with said enlarged chamber; and
at least one row of aligned fluid impulse buckets fashioned within the surface of said plug valve means and positioned such that when said first valve means is in open position within said enlarged chamber at the first end thereof an initial one of said at least one row of aligned fluid impulse buckets is in fluid registry with the other end of said at least one alternate flow passage whereby fluid passing through said at least one alternate fluid passage around
said closure will flow impinge upon the fluid impulse buckets successively to rotate and translate said plug valve means from an open position within said enlarged chamber at a first end thereof to a closed position within said enlarged chamber at a second end thereof.

15. A method for automatically controlling the flow of fluid within a flow line by utilizing an elongate flow control apparatus having a housing with a central longitudinal passage therethrough including an enlarged central chamber, said housing having a first end connected with a portion of the flow line and a second end connected with a spaced portion of the flow line comprising the steps of:
automatically closing a pilot valve across said central passage in response to a surge of fluid flow through said central longitudinal passage from the first end of said housing to the second end thereof; and
automatically closing a plug valve in response to closing said pilot valve by,
rotating the plug valve within the enlarged central chamber, and
translating the plug valve within the enlarged central chamber from an open position at a first end thereof to a closed position at a second end thereof.

16. A method for automatically controlling the flow of fluid within a flow line as defined in claim 15 wherien said step of automatically closing a plug valve is effectuated by:
  diverting fluid from said central longitudinal passage around said closed pilot valve, and
  directing the diverted fluid onto the periphery of said plug valve to rotate and translate the plug valve to a closed position within said enlarged central chamber.

17. A method for automatically controlling the flow of fluid within a flow line as defined in claim 16 further comprising the step of:
  guiding the main valve during translating motion thereof within the enlarged chamber.

18. A method for automatically controlling the flow of fluid within a flow line as defined in claim 17 and further comprising the step of:
  automatically reopening the plug valve by,
    rotating the plug valve within the enlarged central chamber, and
    translating the plug valve within the enlarged central chamber from a closed position at the second end thereof to an open position at the first end therof.

19. A method of automatically controlling the flow of fluid within a flow line as defined in claim 18 and further comprising the step of:
  delivering fluid from said central longitudinal passage to tangentially impinge upon the surface of the main valve to initiate the automatic reopening rotational motion thereof.

* * * * *